United States Patent [19]

Stephens

[11] Patent Number: 4,627,015

[45] Date of Patent: Dec. 2, 1986

[54] TEXT PLACEMENT ON GRAPHICS SCREEN

[75] Inventor: Lawrence K. Stephens, Dallas, Tex.

[73] Assignee: International Business Machines Corp., Armonk, N.Y.

[21] Appl. No.: 499,451

[22] Filed: May 31, 1983

[51] Int. Cl.⁴ ...................... G06F 3/00; G06F 15/626; G09G 1/06

[52] U.S. Cl. .................................... 364/900; 364/521; 340/709; 340/724

[58] Field of Search ... 364/200 MS File, 900 MS File, 364/518, 521, 522; 340/709, 710, 711, 715, 724, 725, 726; 273/DIG. 28

[56] References Cited

U.S. PATENT DOCUMENTS

| | | | |
|---|---|---|---|
| 4,197,590 | 4/1980 | Sukonick et al. | 364/900 |
| 4,296,476 | 10/1981 | Mayer et al. | 364/900 |
| 4,354,184 | 10/1982 | Woborschil | 340/709 |
| 4,445,194 | 4/1984 | Cason et al. | 364/900 |
| 4,476,462 | 10/1984 | Feldman | 340/711 |
| 4,503,427 | 3/1985 | Iida | 340/731 |
| 4,521,014 | 6/1985 | Sitrick | 273/DIG. 28 |
| 4,566,000 | 1/1986 | Goldman et al. | 340/709 |

FOREIGN PATENT DOCUMENTS

| | | | |
|---|---|---|---|
| 58-14242 | 1/1983 | Japan | 340/709 |
| 58-66140 | 4/1983 | Japan | 340/709 |

OTHER PUBLICATIONS

Warren Teitelelman, "A Display Oriented Programmer's Assistant", Int. J. Man-Machine Studies (1979) 11, 157-187.

Larry Tesler, "The Smalltalk Environment", Byte, Aug. 1981, p. 90 et seq.

Edward W. Birss, "The Integrated Software and User Interface of Apple's Lisa", AFIPS Conference Proceedings, 1984 National Computer Conference, Jul. 9-12, 1984, pp. 319-322.

Gregg Williams, "The Lisa Computer System", Byte, Feb. 1983, p. 33 et seq.

Gregg Williams, "The Apple Macintosh Computer", Byte, Feb. 1984, p. 30 et seq.

Burrell Smith, "Macintosh System Architecture", Byte, Feb. 1984, pp. 32-37.

"Das Farbsichtgeratesystem PAN 30M in Wehrtechnischen Fuhrungssystemen", BCC-Nachrichten, vol. 63, No. 10, 1981, pp. 358-368.

*Primary Examiner*—James D. Thomas
*Assistant Examiner*—Thomas C. Lee
*Attorney, Agent, or Firm*—C. Lamont Whitham

[57] ABSTRACT

A personal computer having an interactive all points addressable display terminal (44) and a cursor positioning device (52) is provided with a keyboard (28) for inputting alphanumeric character strings not exceeding a predetermined maximum length. Once the desired alphanumeric character string has been input, it can be selected as the current cursor character. As the selected current cursor character, the alphanumeric character string is displayed on the all points addressable display and movable by said cursor positioning device. When the alphanumeric character string is positioned at a desired location on the all points addressable display, it can be fixed in that location by reading the alphanumeric character string data into the display buffer.

4 Claims, 11 Drawing Figures

TEXT PLACEMENT ON GRAPHICS SCREEN

RELATED APPLICATIONS

This application is related to the following concurrently filed applications which are assigned to a common assignee and are incorporated herein by reference:

Application Ser. No. 499,458, filed May 31, 1983, by Lawrence K. Stephens and entitled "Schematic Building Cursor Character".

Application Ser. No. 499,452, filed May 31, 1983, by Lawrence K. Stephens and entitled "Current Cursor Symbol Demarkation" now U.S. Pat. No. 4,555,772 issued Nov. 26, 1985.

Application Ser. No. 499,453, filed May 31, 1983, by Lawrence K. Stephens and entitled "Moving Eraser for Graphics Screen".

FIELD OF THE INVENTION

The present invention generally relates to Computer Assisted Design (CAD) systems, and more particularly to an inexpensive and easy to use CAD application for personal computers.

BACKGROUND OF THE INVENTION

Computer Assisted Design (CAD) and Computer Assisted Manufacturing (CAM) systems have been used for some time in the aircraft and automotive industries to design and manufacture aerodynamic and mechanical components. Such systems typically comprise a main frame computer, large bulk memory systems including tape units, rigid disk units and removable disk pack units, high resolution All Points Addrssable (APA) Cathode Ray Tube (CRT) displays, a large Random Access Memory (RAM) of sufficient capacity to store the graphics application and address each pixel of the high resolution displays, and Input/Output (I/O) devices such as digitizer pads with cursors and plotters. These systems are very expensive, but their can could be justified because of the large sums of money invested in the design and manufacture of an aircraft or a new automobile model. The price of CAD systems has come down significantly over the past decade due to economies of computer and memory system manufacture, and because of that, CAD systems are being applied to many new uses among which are architectual design and the layout of photoresist patterns for integrated circuits. Nevertheless, CAD systems are still quite expensive, and their use is generally limited to correspondingly expensive applications.

At the other end of the spectrum are the so-called personal computers based on the microprocessors which have been developed over the past decade. These typically comprise a mother board containing the microporcessor, a Read Only Memory (ROM) encoded with the Basic Input/Output System (BIOS) for controlling the microporcessor, a limited amount of RAM, and a number of adapters for interfacing with various I/O devices. These I/O devices may include a keyboard, a medium or high resolution CRT display, one or more floppy disk drives, and a printer such as one of the more popular dot matrix printers. Although personal computers are small and compact, they are capable of some fairly sophisticated applications. They are especially well suited to business applications such as accounting, data base management and business analysis. Recently, a number of business applications have been developed which include graphics support. These applications take the input or calculated numerical data and produce line graphs, bar charts and pie charts which are much easier to interpret than the raw numerical data. Prints of these graphical displays are made by reading out the data in the APA display RAM to a dot matrix printer provided with a graphical capability or to an inexpensive pen plotter. The latter device is also capable of generating transparencies for use in overhead projectors. The acceptance of business applications with graphics support has been immediate and substantial with the result that there is a considerable demand for graphics applications which are not necessarily limited to business graphs. The ability to generate schematic diagrams, flow charts, floor plans and similar graphic displays would be highly desirable in the production of technical manuals, advertising layouts and the like.

SUMMARY OF THE INVENTION

It is therefore an object of the invention to provide an inexpensive Computer Assisted Design (CAD) application for personal computers.

It is another object of the invention to provide a CAD system for personal computers which is easy to use and facilitates the generation of schematic diagrams, flow charts and other free form graphics displays.

It is a further object of the invention to provide a user friendly CAD application for personal computers which is operated by an inexpensive joy stick or similar device and supports a dot matrix printer or inexpensive plotter.

The objects of the invention are accomplished by making the cursor symbol a graphics character or an A/N string which may be moved about the display screen by means of a joystick or similar input device. Once the graphics character or A/N string is positioned at the desired location, the operator presses a command button, and the graphics symbol or A/N string is fixed in position on the display screen by reading the symbol data into the display buffer at that position. The cursor symbol can be moved again to another location on the display and another character fixed in position on the display by pressing the command button. Different cursor symbols can be selected from symbol tables so that a variety of symbols can be used to generate the graphics display. The current cursor symbol is demarked from other graphics characters fixed in the display by continuously exclusive ORing the cursor symbol with the background graphics data. In addition, an erase function is provided to allow the correction of mistakes and modification of standard symbols.

BRIEF DESCRIPTION OF THE DRAWINGS

The foregoing and other subjects, advantages and aspects of the invention will be better understood from the following detailed description of the invention making reference to the accompanying drawings, in which.

DESCRIPTION OF A PREFERRED EMBODIMENT

Figure 1:
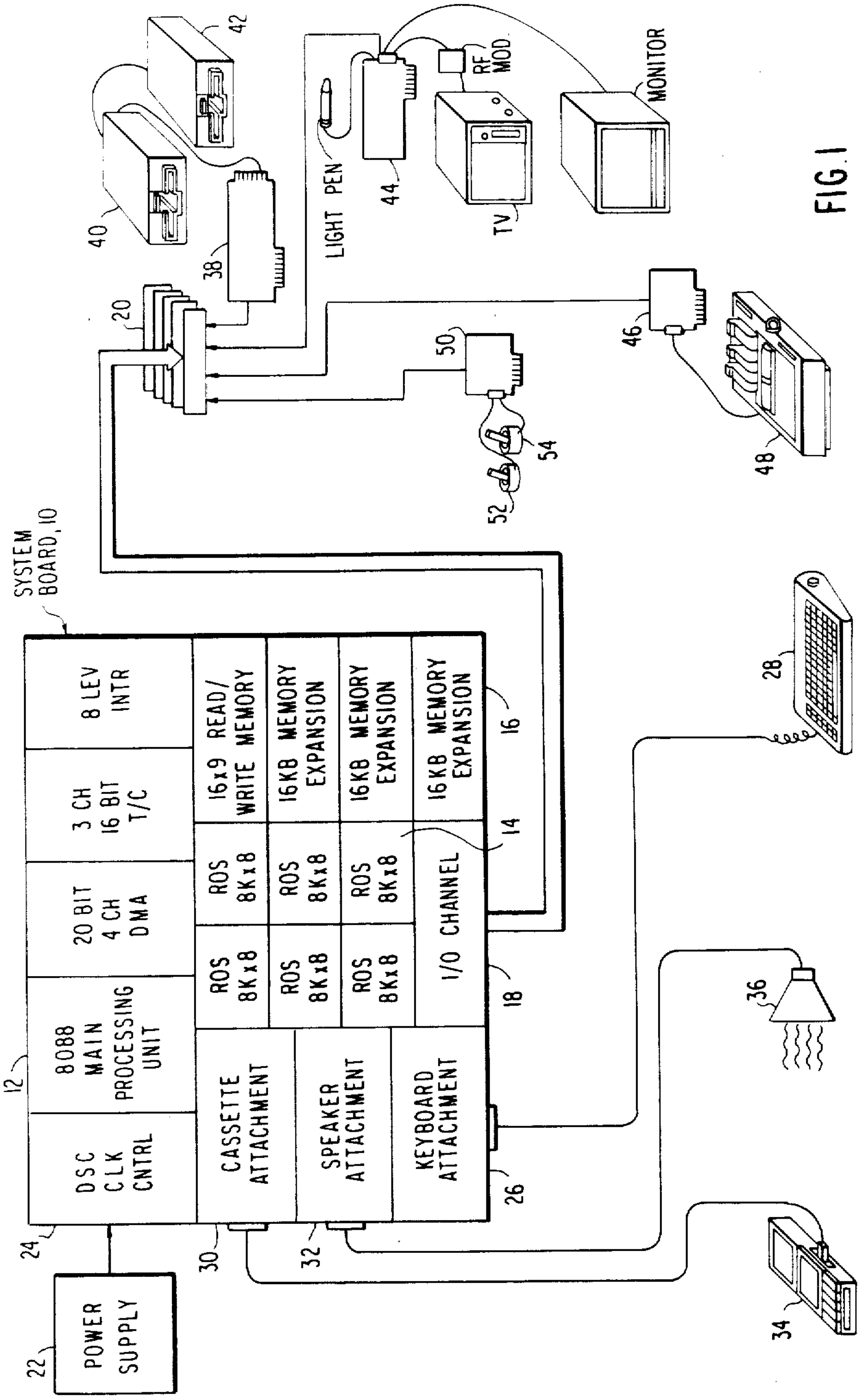
FIG. 1 is a system block diagram of a typical personal computer on which the application according to the invention is operated.

In order to better understand the invention, a typical personal computer will be first described with reference to FIG. 1 of the drawings. The system or mother board 10 includes the microporcessor 12, ROM 14, RAM 16, and an I/O channel 18 which includes a number of I/O expansion slots 20 for the attachment of various options. A power supply 22 provides power to the mother board 10 and the attached options. The mother board 10 in addition includes a crystal oscillator, clock and control circuits 24 and a keyboard attachment 26 to which a keyboard 28 is attached. In addition, the mother board may also include other attachments such as a cassette attachment 30 and a speaker attachment 32 to which are connected a cassette recorder 34 and a speaker 36, respectively. The expansion slots 20 are designed to receive any of the various adapter printed circuit cards shown in the figure. More specifically, a diskette drive adapter 38 may be plugged into one of the slots 20. This adaptor 38 is required to support one or more diskette drives 40 and 42. A color/graphics monitor adapter 44 may also be plugged into one of the slots 20, and this adapter supports either a home color TV or an RGB monitor and a light pen. A parallel printer adapter 46 may be plugged into another one of slots 20 to support, for example, a dot matrix printer 48. Finally, a game control adapter 50 can be plugged into a remaining one of the slots 20 to support one or more joy sticks 52 and 54. Other adapters may be plugged into the slots 20, but only those necessary to support the present invention are illustrated.

Figure 2:
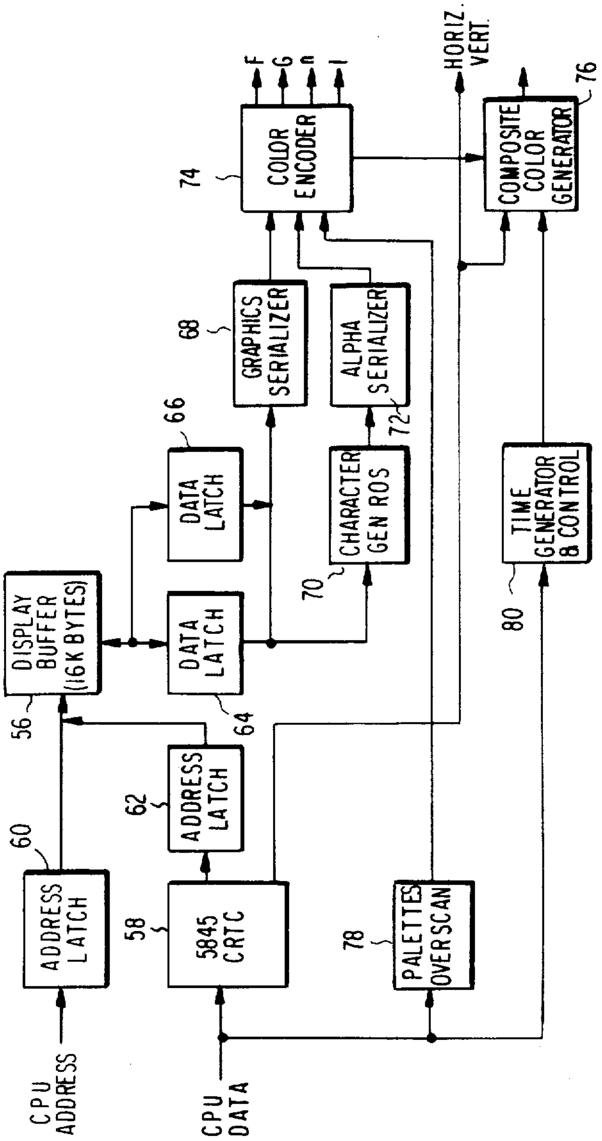
FIG. 2 is a block diagram of a color/graphics monitor adapter of the type which is required to support the application according to the invention.

The color/graphics adapter 44 has two basic modes of operation; alphanumeric (A/N) and APA. In both modes, A/N characters are defined in a character box and formed from a ROM character generator containing dot patterns for standard ASCII characters. FIG. 2 is a block diagram of the adapter 44 which contains a display buffer 56 and a CRT controller device 58 such as a Motorola 6845 IC. The controller device 58 provides the necessary interface to drive a raster scan CRT. The display buffer 56 can be addressed by both the CPU and the controller device 58 through address latches 60 and 62, respectively. Data is read out of the display buffer to data latches 64 and 66 which provide outputs to a graphics serializer 68 and a character generator comprising ROM 70 and an alpha serializer 72. The outputs of the serializers 68 and 72 are provided to the color encoder 74 which either drives an RGB monitor directly or provides an output to the composite color generator 76 that drives a home color TV. The color encoder 74 also receives the output of the palette/overscan circuits 78 which provides intensity information. The composite color generator 76 receives horizontal and vertical sync signals from the CRT controller device 58 and timing control signals from the timing generator and control circuits 80. The timing generator and control circuits also generate the timing signals used by the CRT controller device 58 and the display buffer 56 and resolves the CPU and controller contentions for accessing the display buffer.

Figure 3:
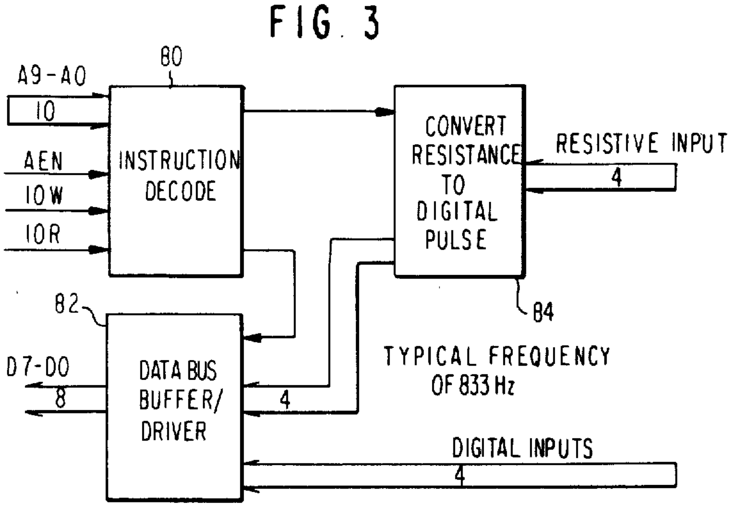
FIG. 3 is a block diagram of a game control adapter of the type which provides a joystick input to the personal computer shown in FIG. 1.

FIG. 3 is a block diagram of the game control adapter 50. The adapter comprises instruction decode circuits 80 which may be composed of 74LS138 IC's. The data bus is buffered by a 74LS244 buffer/driver 82. The digital inputs to this buffer/driver are provided by trigger buttons on the joy sticks. The joystick positions are indicated by a potentiometer for each coordinate which must be converted to digital pulses by resistance to pulse converter 84. This is accomplished by providing a one-shot for each potentiometer so that the potentiometer varies the time constant of its associated one-shot. A select output from decoder 80 causes the one shots to be fired to provide pulse outputs to the buffer/driver 82.

Although the invention is described as using a joy stick to position a cursor symbol on the display screen, it will be understood by those skilled in the art that other input devices can be used including cursor keys on a keyboard. The cursor keys are, however, inherently slow to operate, and so it is prefereable to use a joy stick or similar type input device. Besides a joy stick, a "mouse" might just as well be used. These devices have a ball on the bottom of a palm size controller, and the ball is rolled on a flat surface to control the cursor position. Typically, the ball actuates potentiometers in a manner quite similar to a joy stick. Thus, everywhere a joy stick is mentioned in the description of the invention, those skilled in the are will recognize that a "mouse" or other similar input device could be substituted.

According to the invention, the cursor on the CRT display is replaced by a graphics symbol or an A/N character string and moved by means of a joy stick or similar device. When the graphics symbol or A/N character string are positioned on the display at the desired position, the operator presses a trigger button on the joy stick and the graphics symbol or A/N character string remain fixed at that location by reading the symbol data into the display buffer. A new graphics character or A/N character string can then be selected for the cursor symbol and the process repeated so that a schematic diagram, flow chart or similar graphics display can be built. Previously positioned graphics characters or A/N character strings can be erased totally or partially by means of a box cursor and the operation of the trigger button on the joy stick. This allows not only for the correction of errors but also the generation of modified characters giving more flexibility to the defined character tables. In addition, since the selected cursor symbol will remain the cursor symbol until changed even after a graphics character or A/N character string has been positioned on the display screen, the cursor symbol is at all times exclusive ORed with display data of all coincident pixels as it is moved about the display screen to provide a clear and visible demarkation of the cursor symbol from other symbols previously placed at various locations on the display screen. Thus, the invention allows a fully interactive positioning of graphics characters and/or A/N character strings at any addressable point on the display screen. Since the screen information is contained in the APA display buffer, the screen can be printed in the usual way to provide a hard copy output thereby facilitating the production of technical illustrations, manuals or the like.

Figure 4:
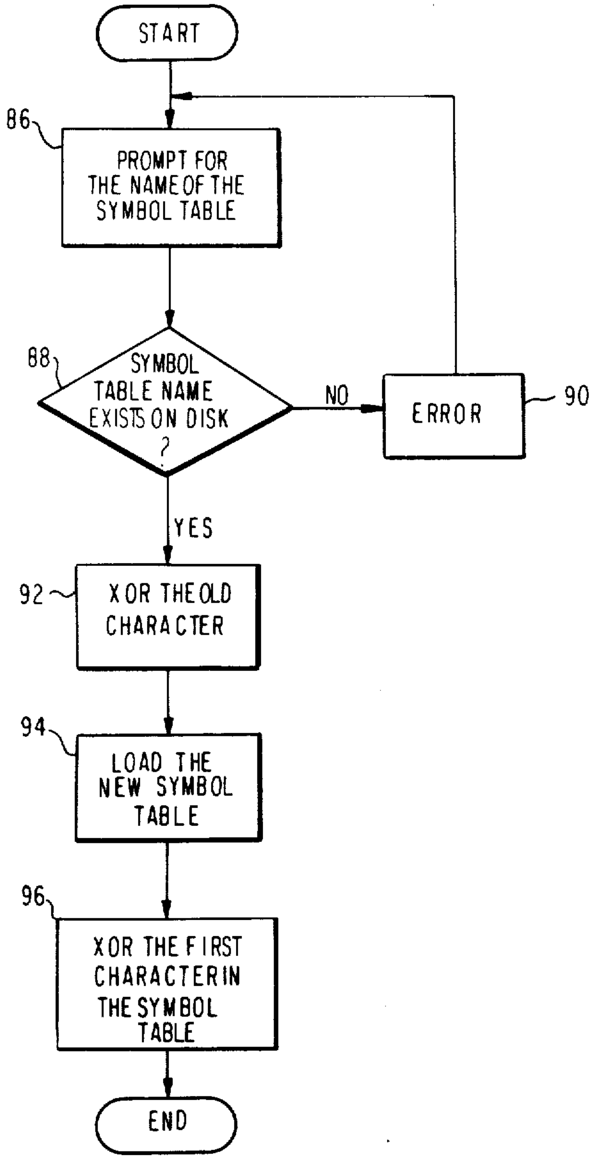
FIG. 4 is a flow diagram illustrating the procedure for loading a cursor symbol table.

The underlying feature of the invention is the use of a graphics character as the cursor symbol. Therefore, one and preferrably more symbol tables are provided. For example, a table could be provided for electrical symbols, another for architectual symbols, and another for industrial process symbols. Each symbol in each table is identified by number so that the code for a symbol includes both the table to which it belongs as well as its number within the table. In order to select a cursor symbol, a symbol table must first be loaded into RAM. This process is illustrated by the flow diagram shown in FIG. 4. When the operator requests a new symbol table, s/he is first prompted for the name of the symbol table as indicated by block 86. The name input by the operator is checked to determine if it is a valid name, that is it identifies a table that exists in the current library of tables. This is indicated by the decision block 88. If the name is not a valid name, an error message is displayed to the operator at block 90 and the operator is again prompted for the name of the symbol table desired. When a valid name is input by the operator, the old cursor symbol is exclusive ORed with itself to delete the symbol from the display screen as indicated by block 92. Then in block 94 the new symbol table is loaded into RAM, and in block 96, the first graphics character is exclusive ORed with the current cursor symbol to cause the first graphics character to be displayed as the cursor symbol. In other words, the first graphics character is the default cursor symbol.

Figure 5:
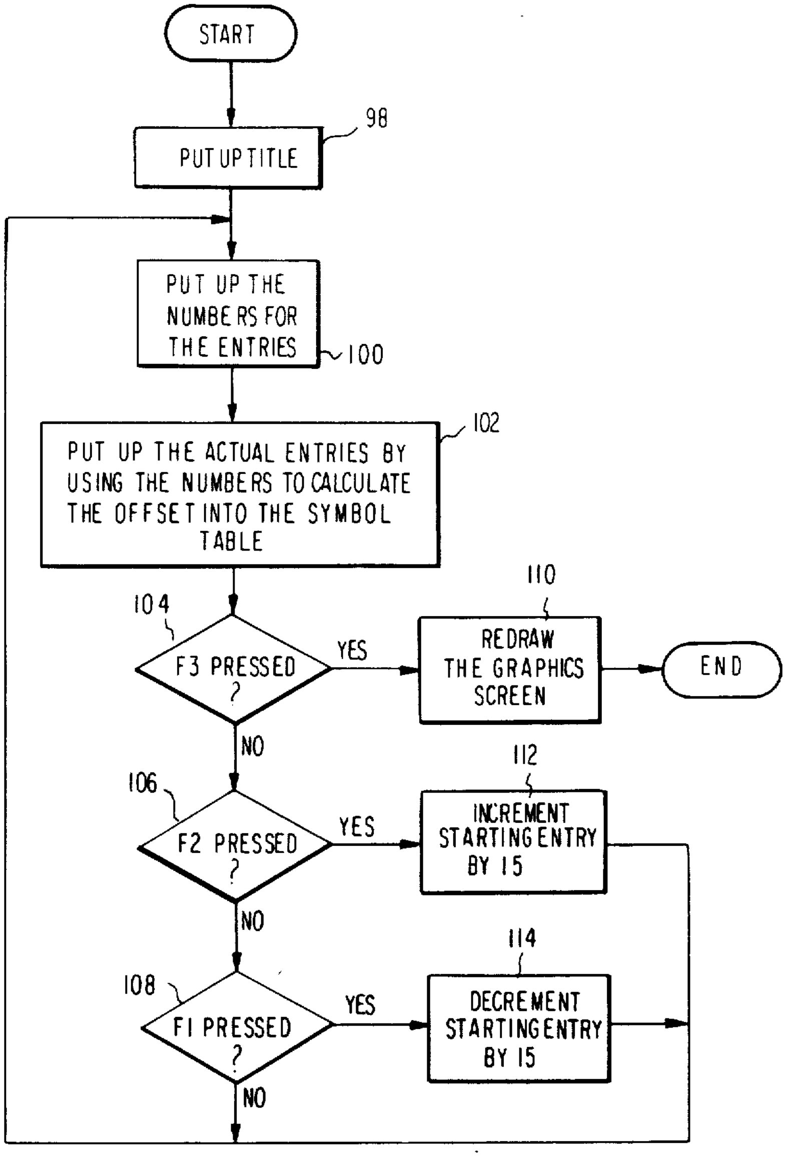
FIG. 5 is a flow diagram illustrating the procedure for displaying a loaded cursor symbol table.

The default cursor symbol may not be the symbol desired by the operator, so it may be desirable to display the selected symbol table to permit selection of the desired symbol. This process is illustrated by the flow diagram shown in FIG. 5. When the operator requests that the symbol table be displayed, the title of the currently selected symbol table is first displayed as indicated by block 98. The title will always be displayed during this process no matter how the field of the display may change. In other words, any given symbol table may be too large to fit on a single screen and it may be necessary to scroll the display in order for the operator to view all the symbols in the table. While the field of the display may be scrolled, the title placed on the screen by block 98 will remain. Once the title of the table has been put up, the numbers for the various graphics characters are next put up as indicated by block 100, and then the actual graphics characters are put up adjacent their corresponding number as indicated by block 102. Three function keys identified as F3, F2 and F1 are monitored to detect if they have been pressed by the operator as indicated by the decision blocks 104, 106 and 108. If for example key F3 has been pressed, then the graphics screen is redrawn as indicated by block 110. When this is done, the operator is presented a display of the graphics screen as s/he had generated it to that point in time. If F2 is pressed, then the symbol table is scrolled down a predetermined amount as indicated by block 112, but if F1 is pressed, the symbol table is scrolled up a predetermined amount as indicated by block 114. In other words, the function keys F3, F2 and F1 give the operator control of the display screen after the symbol table is displayed. F3 allows the operator to exit the display, and F2 and F1 allow the operator to scroll the display.

Figure 6:
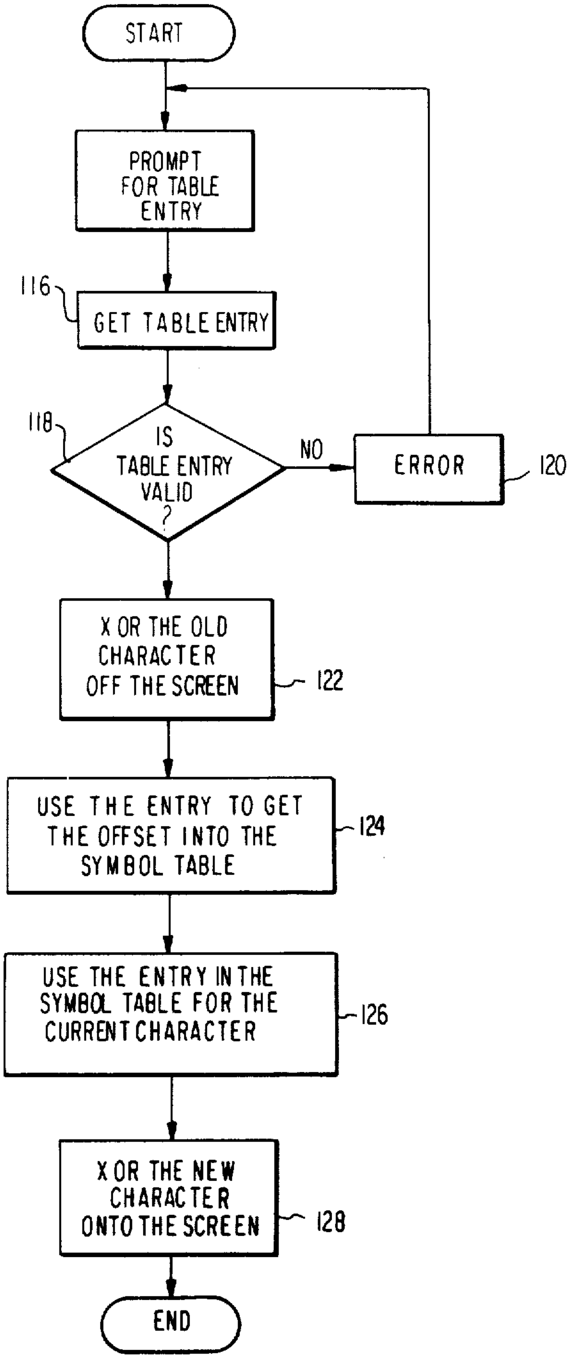
FIG. 6 is a flow diagram illustrating the procedure for selecting a new cursor symbol for a loaded symbol table.

It is not necessary to display the symbol table each time it is desired to change the cursor symbol. The operator may already know the numbers of the symbols s/he wants to use in generating a graphics display, or more likely, the operator will have printed copies of the symbol tables to refer to. In any event, once a symbol table has been loaded according to the process illustrated in FIG. 4 and the first symbol of the table is displayed as the default cursor symbol, the operator may wish to change the cursor symbol. This is accomplished with the selection of a new symbol according to the procedure illustrated in the flow diagram of FIG. 6. The operator selects a cursor symbol by number within the currently loaded table. The first thing that is done when a cursor symbol selection has been made is to retrieve the table entry as indicated in block 116 and then in block 118 validate the entry. It will be understood that the various cursor symbol tables will not necessarily be the same size and that a symbol number that is valid for one table may not be valid for another. Should the operator enter an invalid symbol number, an error message is displayed as indicated by block 120 and the operator is returned to the selection menu. Assuming that a valid symbol number is selected, the old cursor symbol is deleted from the screen by exclusive ORing the symbol with itself as indicated in block 122. Then using the table entry, the offset into the symbol table is determined in block 124. This provides the access to the desired symbol code for the character generator in block 126, and in block 128, the new cursor symbol is displayed by exclusive ORing the symbol with the background data on the screen.

Figure 7:
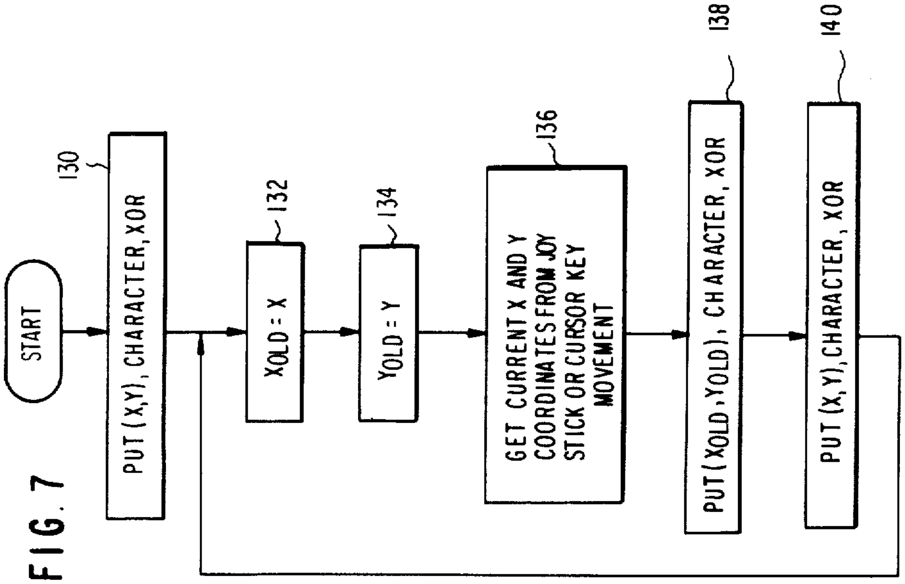
FIG. 7 is a flow diagram illustrating the procedure for demarking the current cursor symbol for other graphics symbols which may be displayed on the screen.

This latter process is the basis for demarking the current cursor symbol from other graphics symbols already placed in the graphics display. It will be appreciated that since the cursor of the subject invention is not a conventional cursor mark but rather a graphics symbol that is moved like a cursor to a desired position on the display screen and then fixed by command, there is the possibility that the operator might lose track of where and which of several currently displayed symbols is the cursor. This is accomplished in part by making the cursor symbol a flashing symbol as is conventional, but in addition, the current cursor symbol is exclusive ORed with the backbround display data to clearly demark the symbol where ever it may be on the screen from other graphics data already in place on the screen. This procedure is illustrated by the flow diagram shown in FIG. 7. In block 130, the current X,Y position as commanded by the joy stick control and the cursor symbol data are input and exclusive ORed. Then in blocks 132 and 134, the X and Y positions are temporarily stored as $X_{old}$ and $Y_{old}$. The current X and Y coordinates are obtained from the joy stick or cursor key input in block 136. Then in blocks 138 and 140 $X_{old}$, $Y_{old}$ and the cursor symbol data are exclusive ORed and current X,Y and the cursor symbol data are exclusive ORed. This removes the cursor symbol from the display screen and then redisplays it at its new location. The process is then repeated.

Figure 8:
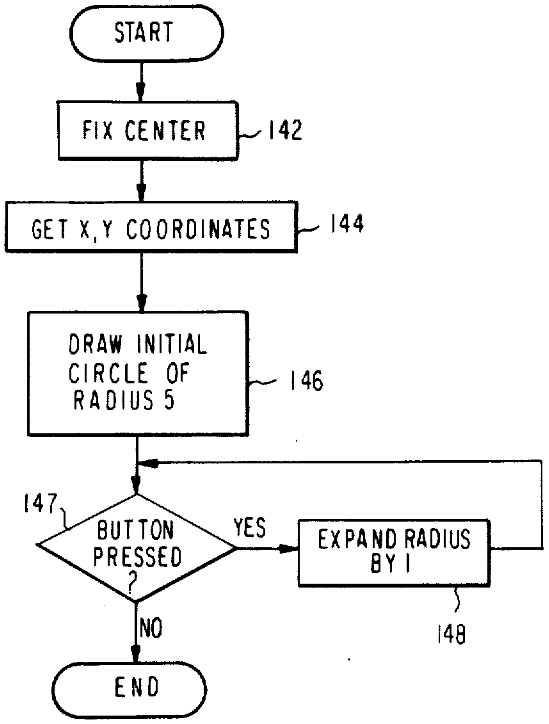
FIG. 8 is a flow diagram illustrating the procedure for generating a circle of any radius at any desired position on the display screen.

Besides the several symbol tables from which the operator can select a variety of cursor symbols, lines can be drawn between positioned symbols by indicating the coordinates of the end points of the line in the conventional manner. In addition, many graphics displays will make use of circles or arcs. Rather than provide a table of circles, a process for displaying a circle of any desired radius is provided. This process is illustrated in the flow diagram shown in FIG. 8. First the operator presses a function key F5 to indicate that s/he desires to draw a circle. This causes a conventional cursor symbol to appear on the screen and represents the center of the circle. The operator can then position this center on the screen using the joy stick. Then by pressing the trigger button on the joy stick, the circle center is fixed as indicated by block 142. Once this is done, the X,Y coordinates of the center are obtained in block 144, and in block 146, a circle of five units is drawn. This is the smallest diameter circle that is displayed. The trigger button is then monitored as indicated by the decision block 146, and if it is pressed, the circle is expanded by one unit in block 148. In this way the operator can increase the size of the circle, and when the desired size has been reached, the operator releases the trigger button.

Figure 9:
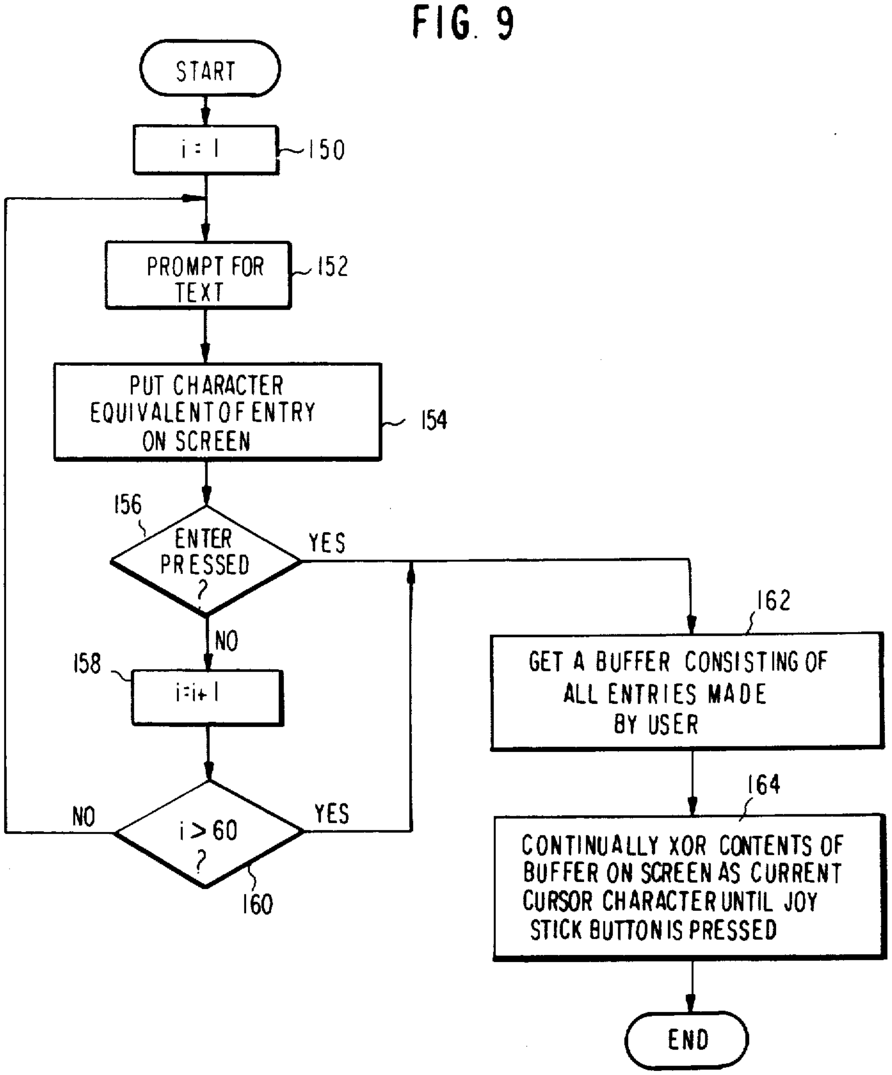
FIG. 9 is a flow diagram illustrating the procedure for entering and positioning A/N strings in the display.

As previously mentioned, the cursor symbol may be an A/N string as well as a graphics character. The operator enters the A/N mode by making the appropriate menu selection. The process is illustrated by the flow diagram shown in FIG. 9. The number of A/N characters entered are counted and so in block 150, the counter is set to 1. The operator is prompted in block 152 to input text from the keyboard, and as each character is keyed, the character equivalent of the operator's entry is put on the screen in block 154. Assuming that the "ENTER" key has not been pressed in decision block 156, the counter is incremented by one in block 158 and then checked in decision block 160 to determine if the maximum allowed number of characters has been entered. In the case illustrated, the maximum number of characters is sixty, but any number of characters can be arbitrarily set. The process continues until either the operator presses the "ENTER" key or the maximum number of characters has been entered at which time a buffer is loaded with all the A/N characters keyed by the operator as indicated by block 162. This buffer is treated as the cursor symbol data which can be positioned anywhere on the display screen by use of the joy stick. Thus, the A/N string is continually exclusive ORed on the screen as the current cursor until the trigger button is pressed by the operator as indicated by block 164. In other words, when the operator enters the text mode from the menu, s/he first keys in the desired text, presses "ENTER" and then moves the A/N string around the screen as the current cursor symbol. When the text string is in the desired position, the trigger button on the joystick is pressed and the A/N string is fixed in the display data field.

Figure 10:
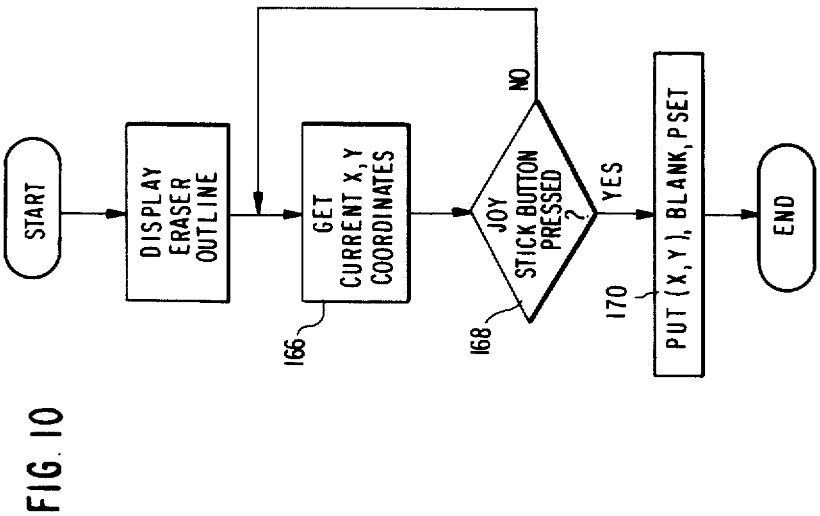
FIG. 10 is a flow diagram illustrating the procedure for erasing previously entered graphics data on the screen.

All good designers need an eraser to correct mistakes and modify standard symbols. The erase mode is entered by making the appropriate selection from a menu, and upon entry into this mode, the cursor symbol is changed to a rectangular box of predetermined dimensions. The process is illustrated by the flow diagram shown in FIG. 10. After the menu selection, the current X,Y position of the "eraser" rectangle is obtained as indicated in block 166. In decision block 168, the trigger button on the joy stick is monitored to determine if it has been pressed. If it has not been pressed, the position of the "eraser" rectangle is checked again and so on while the operator moves the "eraser" rectangle around the display screen. When the "eraser" rectangle is positioned over that area of the display screen which is desired to be erased, the operator presses the trigger button which causes all the display data within the "eraser" rectangle to be set to "zeros" to blank that area of the display screen as indicated by block 170. It is also possible to mover the "eraser" rectangle with the joy stick while pressing the trigger button which will result in all display data within the path of the "eraser" rectangle to be reset to "zeros". The procedure allows graphics data to be removed from the display screen easily and accurately.

Figure 11:
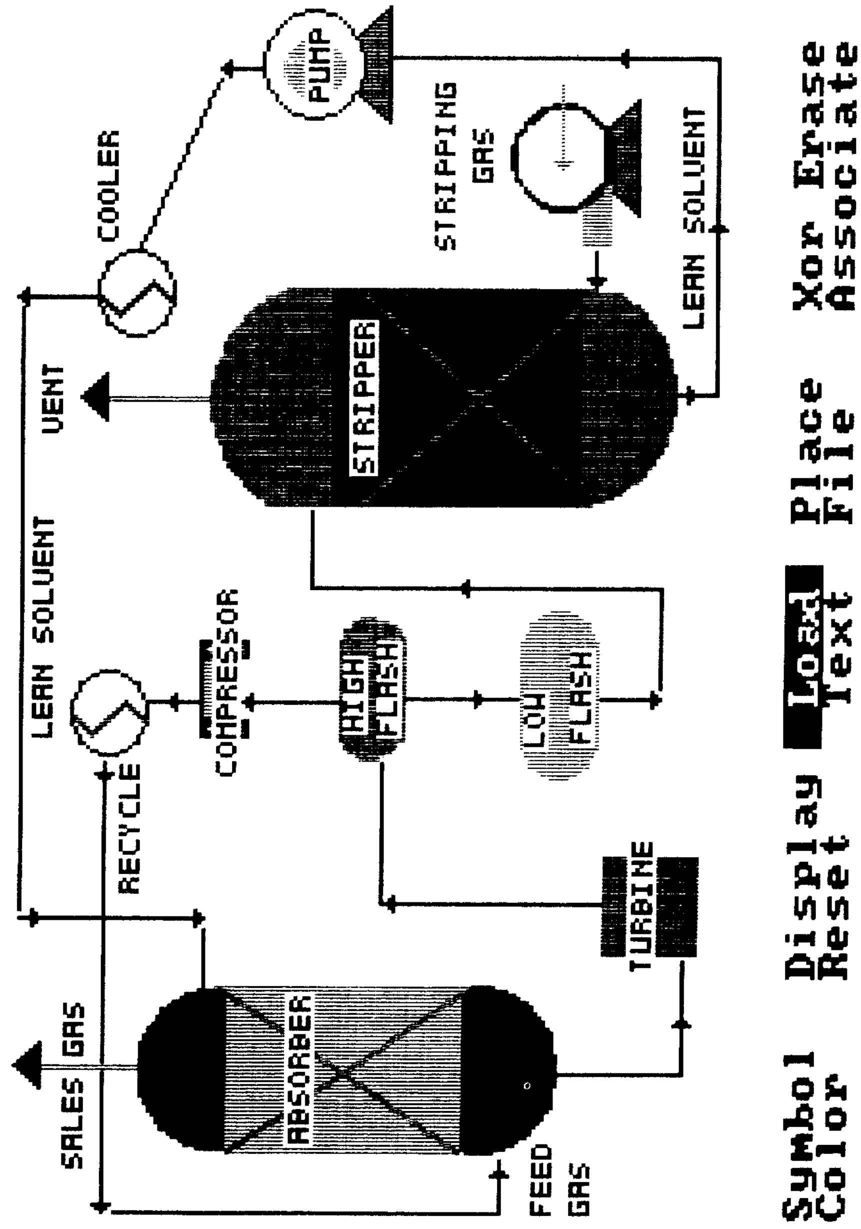
FIG. 11 illustrates a sample display generated using the application according to the invention.

FIG. 11 is an illustration of a graphics display constructed using the invention. Only a few graphics symbols were used plus circles, lines and A/N strings. Each symbol was selected from a table of symbols and then positioned at a desired location on the display screen using the joy stick and trigger button. At the bottom of the display is a menu from which the operator may make selections of operating modes.

Attached as an appendix to application Ser. No. 499,458 entitled "Schematic Building Cursor Character" is the code listing of the application according to the invention. This code listing was prepared using the IBM Personal Computer BASIC Compiler. This code listing is incorporated herein by reference, and the reader is referred to application Ser. No. 499,458 for the details of the code. From the foregoing, it will be appreciated that the invention provides an inexpensive CAD application for personal computers which is easy to use and facilitates the generation of many graphics displays that heretofore could be generated using only much more expensive equipment.

I claim:

1. A method of text placement on a graphics screen of a computer system, said graphics screen being an all points addressable screen for displaying graphics data from a display buffer, said method comprising the steps of:

interactively inputting an alphanumeric string to said computer using a keyboard;

storing said alphanumeric character string in a text buffer in said computer system;

displaying on said graphics screen said alphanumeric character string stored in said text buffer as a cursor symbol;

inputting cursor position data to said computer system using a cursor positioning device;

moving said cursor symbol to a desired position on said graphics screen by exclusive ORing the alphanumeric character string in said text buffer with all points addressable graphics data in said display buffer at the location of said cursor position data thereby placing said text comprising said alphanumeric character string on said graphics screen;

providing an input to said computer system indicating that said alphanumeric character string is to be fixed at a current location of said cursor; and writing said alphanumeric character string into said display buffer data at the current location of said cursor.

2. The method of text placement as recited in claim 1 further comprising the steps of:

counting the characters in said alphanumeric character string as they are entered from said keyboard;

comparing the number of characters entered with a predetermined number;

checking for a user input indicating an end of said alphanumeric character string; and performing said storing step when either the number of characters entered equals said predetermined number or a user input indicating the end of said alphanumeric character string is detected.

3. A computer system providing an interactive graphics display comprising:

a graphics screen connected to said computer system;

a display buffer for storing all points addressable graphics data, said display buffer being connected to said graphics screen and supplying said graphics data for display on said graphics screen;

a keyboard connected to said computer system for interactively inputting an alphanumeric character string to said computer system;

a text buffer in said computer system for storing an alphanumeric character string input to said computer system from said keyboard;

means in said computer system for displaying said alphanumeric character string stored in said text buffer on said graphics screen as a cursor symbol;

a cursor positioning device connected to said computer system for inputting cursor position data to said computer system;

means in said computer system for moving said cursor symbol to a desired location on said graphics screen by exclusive ORing the alphanumeric character string in said text buffer with the all points addressable graphics data displayed on said graphics screen at the location of said cursor position data thereby placing text comprising said alphanumeric character string at said desired location on said graphics screen;

means in combination with said cursor positioning device for providing a user input indicating that text is to be fixed on said graphics screen; and means in said computer responsive to said means in combination with said cursor positioning device for writing said alphanumeric character string into said display buffer at the current location of said cursor.

4. The computer system recited in claim 3 further comprising:

means in said computer for counting the number of characters in an alphanumeric character string input by a user for said keyboard;

means in said computer for comparing the number of characters input with a predetermined number;

means on said keyboard for providing an input from the user of an indication of an end of said alphanumeric character string;

means in said computer responsive to said comparing means and to said means on said keyboard for storing an input alphanumeric character string in said text buffer when either the number of characters in said alphanumeric character string is equal to said predetermined number of when an input for the user is received by said means on said keyboard.

* * * * *